US011302088B2

(12) United States Patent
Driancourt et al.

(10) Patent No.: US 11,302,088 B2
(45) Date of Patent: Apr. 12, 2022

(54) AUGMENTED REALITY DISPLAY DEVICE AND PROGRAM

(71) Applicant: SQUARE ENIX CO., LTD., Tokyo (JP)

(72) Inventors: Remi Driancourt, Tokyo (JP); Makoto Tsuda, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/337,347

(22) Filed: Jun. 2, 2021

(65) Prior Publication Data

US 2021/0383610 A1  Dec. 9, 2021

(30) Foreign Application Priority Data

Jun. 4, 2020  (JP) .............................. JP2020-098060

(51) Int. Cl.
*G06T 19/00* (2011.01)
*G06T 17/00* (2006.01)
*G06K 9/00* (2022.01)

(52) U.S. Cl.
CPC ........ *G06T 19/006* (2013.01); *G06K 9/00664* (2013.01); *G06T 17/00* (2013.01)

(58) Field of Classification Search
None
See application file for complete search history.

(56) References Cited

U.S. PATENT DOCUMENTS

| 10,529,112 | B1* | 1/2020 | Mintz | ................ | H04N 5/23299 |
| 2020/0211251 | A1* | 7/2020 | Noris | ....................... | G06F 3/033 |
| 2021/0322856 | A1* | 10/2021 | Virkar | ................ | A63B 24/0062 |

FOREIGN PATENT DOCUMENTS

| JP | 2012118948 A | 6/2012 |
| JP | 2017220059 A | 12/2017 |

* cited by examiner

*Primary Examiner* — Robert J Craddock
(74) *Attorney, Agent, or Firm* — Dorsey & Whitney LLP

(57) ABSTRACT

Provided is an augmented reality technology configured to combine images in a virtual space in real-time.
An augmented reality display device includes an imaging unit that acquires a background image of a real world, a model control unit that controls a two-dimensional or three-dimensional model in a virtual space, and a display unit that displays the model together with the background image. The model includes one or a plurality of joints connectable to another model. The model control unit controls each model to connect a joint of a first model and a joint of a second model in the virtual space.

8 Claims, 12 Drawing Sheets

FIG. 4A

Model Table

| Model ID | Series | Part | Model Name | Joint | | | |
|---|---|---|---|---|---|---|---|
| 0001 | Series A | Head | Head 1 | H1 | | | |
| 0002 | Series A | Body | Body 1 | B1 | B2 | B3 | B4 |
| 0003 | Series A | Left Arm | Left Arm 1 | LA1 | | | |
| 0004 | Series A | Right Arm | Right Arm 1 | RA1 | | | |
| 0005 | Series A | Leg | Leg 1 | L1 | | | |
| 0006 | Series B | Head | Head 2 | H2 | | | |
| 0007 | Series B | Body | Body 2 | B1 | B2 | B3 | B4 |
| 0008 | Series B | Left Arm | Left Arm 2 | LA1 | | | |
| 0009 | Series B | Right Arm | Right Arm 2 | RA1 | | | |
| 0010 | Series B | Leg | Leg 2 | L2 | | | |
| ... | ... | ... | ... | ... | | | |

FIG. 4B

Connection Condition Table

| | Connectable Condition | | |
|---|---|---|---|
| Joint | Joint | Additional Condition | Difficulty Level |
| H1 | B1 | | A |
| H2 | B1 | Series B | A |
| B1 | H* | | B |
| B2 | RA1 | | C |
| B3 | LA1 | | B |
| B4 | L* | | B |
| LA1 | B3 | | A |
| RA1 | B2 | | D |
| L1 | B4 | | A |
| L2 | B4 | Series B | B |
| ... | ... | ... | ... |

FIG. 4C

Owned Model Table

| User ID | Owned Model ID | Acquisition Source |
|---|---|---|
| 10001 | 0001 | Generate |
| | 0002 | Capture |
| | 0003 | Download |
| ... | ... | ... |

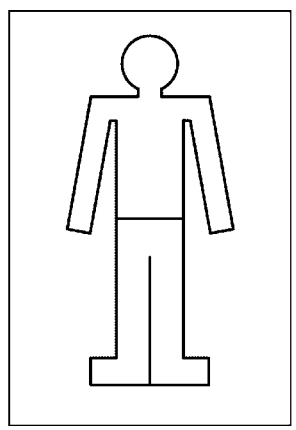
FIG. 7A
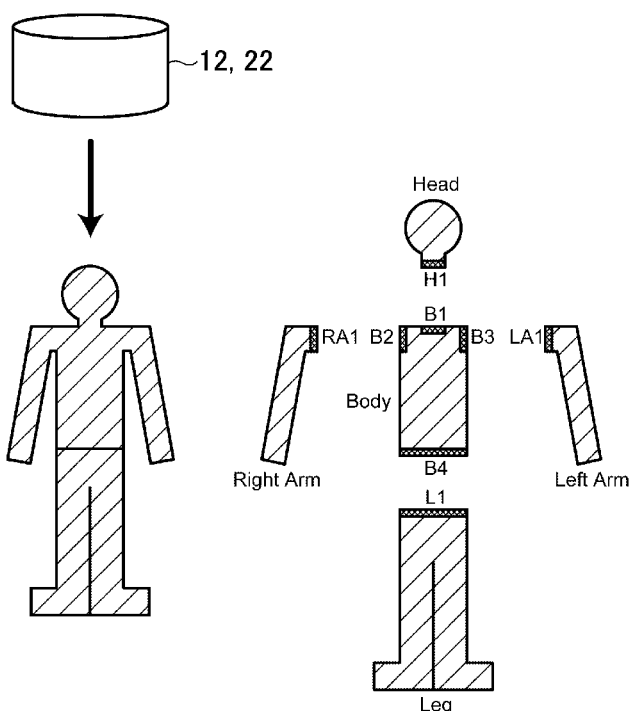
FIG. 7B
FIG. 7C

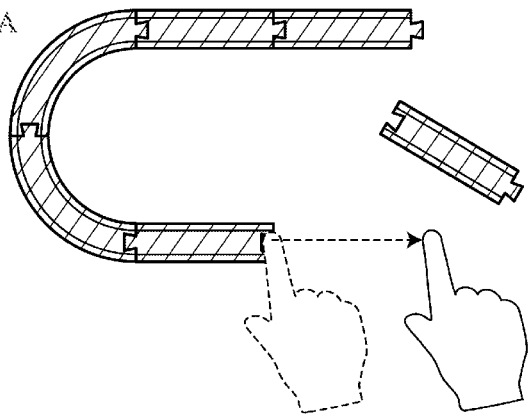
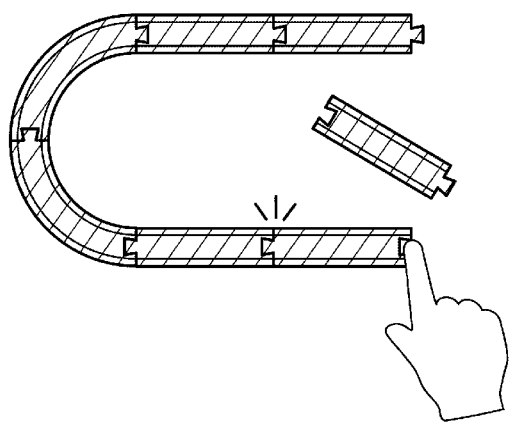 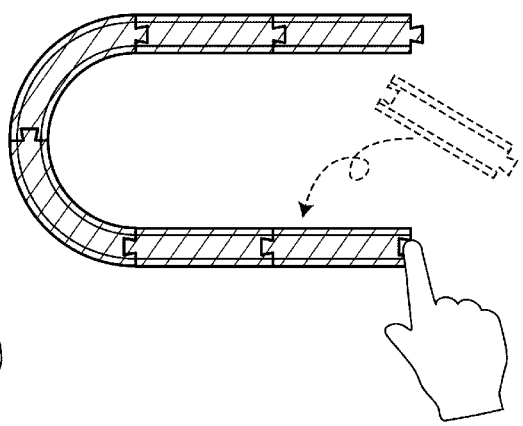

AUGMENTED REALITY DISPLAY DEVICE AND PROGRAM

CROSS-REFERENCE TO RELATED APPLICATION(S)

This application is based upon and claims the benefit of priority of the prior Japanese Patent Application No. 2020-098060, filed on Jun. 4, 2020, the disclosure of which is expressly incorporated herein by reference in its entirety.

BACKGROUND

The present invention relates to a virtual reality display device that displays a virtual model superimposed on a background image of a real world, and a recording medium storing a computer program for realizing the same.

Recently, experience-based video contents referred to as Virtual Reality (VR) and Augmented Reality (AR) have been attracting attention in accordance with the development of a rendering technique of computer graphics and the spread of mobile devices, such as a smart phone and a head-mounted display. VR is a technology that blocks visibility of a real space and presents only a video of a virtual space to a user wearing mainly a head-mounted display, and highly immersive video contents can be presented to the user. In contrast, AR is a technology that displays a two-dimensional model or a three-dimensional model superimposed on a background image while presenting a real space as the background image to a user of a smart phone and a head-mounted display, and highly realistic video contents in which the real space and the virtual model are mixed can be presented to the user. The present disclosure relates to especially an augmented reality (AR) technology among these experience-based video technologies.

Regarding the AR technology, an augmented reality presentation device configured to display a video of a real space and image data in composition has been disclosed. Examples of such device may be found in Japanese Patent Application Publication No. 2012-118948. The device disclosed in Patent Document 1 detects a predetermined part of a person based on three-dimensional image data of the person obtained by photographing, and performs a positioning of the three-dimensional image data of the person and three-dimensional image data, of a plurality of objects based on the detection result. The device disclosed in Patent Document 1 is assumed to be used for, for example, a service of trying on clothes by simulation.

A try-on system for vehicle mounting detects a preliminarily determined reference part of a vehicle in a vehicle image to calculate a mounting reference position of vehicle mounting equipment, and composes the vehicle mounting equipment whose reduction scale is appropriately adjusted on this reference position. Examples of such system may be found in Japanese Patent Application Publication No. 2017-220059. According to the system, various kinds of vehicle mounting equipment (roof box, child seat, and the like) can be tried on to the vehicle and displayed in the screen depending on user preference.

Recently, images of objects (person, vehicle, and the like) have been analyzed in the real spaces and compose the three-dimensional images on the specific parts of the object images. Examples of such method may be found in Japanese Patent Application Publication No. 2012-118948 and Japanese Patent Application Publication No. 2017-220059. The image of the real object and the three-dimensional image are combined (composed), thereby attracting attention of the user. However, an object as a target of composing the three-dimensional image has been required to be present in the real space, and when such a target object is not present, an enjoyment specific to the AR technology cannot be provided to the user.

As a process in a previous step of composing the object of the real space and the three-dimensional image, analyzing the image of the real space to confirm presence of a predetermined object in the image, and detecting a feature, such as a shape, of the predetermined object have been required to specify a part on which the three-dimensional image is composed. Therefore, a load of image processing becomes excessive depending on the processing capacity of a calculating device (smart phone and the like), it is concerned that a delay occurs in an image display. In this case, it is difficult to superimpose the object of the real space and the three-dimensional image in real-time, thus causing a problem that a lag occurs between the object and the image to impair the reality.

SUMMARY

It is a main object of the present disclosure to provide an augmented reality technology that can provide an enjoyment of combining images in a virtual space in real-time to a user irrespective of whether a predetermined object of a real space is present or not.

One or a plurality of joints are preliminarily set to a two-dimensional or three-dimensional virtual model, and a video in which a plurality of models may be combined at the joint is superimposed on a background image of a real world and displayed. Accordingly, a way of playing like an assembling model and a diorama can be realized in real-time by an augmented reality technology using models of a virtual space.

A first aspect of the present disclosure relates to an augmented reality display device. The augmented reality display device according to the present disclosure includes an imaging unit, a control unit, and a display unit. The imaging unit acquires a background image of a real world. The model control unit controls a two-dimensional or three-dimensional model in a virtual space. The display unit displays the model together with the background image. In the present disclosure, the model includes one or a plurality of joints connectable to another model. The model control unit controls each model to connect a joint of a first model and a joint of a second model in the virtual space. In this application, a space in which a real space and a virtual space are combined and a virtual model is superimposed on a real background image is referred to as an "augmented reality space" for convenience.

Like the above-described configuration, by displaying a video of connecting a plurality of models in the virtual space while superimposing the video on a real background image, experience-based contents, such as an assembling model and a diorama, can be achieved by an augmented reality technology. In the present disclosure, since virtual models are mutually combined without depending on actual objects existing in the real world, a new way of playing can be provided to the user under all circumstances. The model in the present disclosure preliminarily includes the joint. This eliminates the need for preprocessing, such as analyzing the shape and the feature of each model, in connecting a plurality of models. Accordingly, since the load in the connecting process of the models is reduced, the delay in the image output process is reduced, thus allowing the output of the video of the augmented reality space in real-time even by a calculating device having a general processing capacity.

In the augmented reality display device according to the present disclosure, the model control unit preferably controls each model to connect the first model and the second model at the joints when the joint of the first model and the joint of the second model are brought in close proximity within a predetermined range in the virtual space. Thus, the joints of the two models approaching each other to within the predetermined range trigger, and then the two models are automatically connected, thereby allowing the user to easily connect the models. Meanwhile, the operation to bring the joints of the respective models in close proximity within the predetermined range of the user is requested, thereby allowing to provide a fun of assembling the models by simulation.

In the augmented reality display device according to the present disclosure, metadata to identify a connectable model or joint is preferably assigned to the joint, in this case, the model control unit analyzes the metadata of the two joints brought in close proximity in the virtual space. Then, the model control unit connects the first model and the second model at the two joints when the two joints brought in close proximity are determined to be mutually connectable. Thus, in the present disclosure, it is not that all the joints are mutually connectable without restriction, but it is only necessary that the joints are each specified (restricted) to other connectable joints. This increases an individuality for each model, thus allowing to provide a way of playing including an element of collection, such as searching or collecting the models connectable to the joint of one model.

The augmented reality display device according to the present disclosure may further include a model generation unit. The model generation unit analyzes an image including a real object, and generates a two-dimensional or three-dimensional model from the real object included in the image. The model generation unit sets one or a plurality of joints to the generated model, and the one or plurality of joints are connectable to another model. Thus, the model including the joint is generated from any image provided from the user, thereby allowing the user to perform a way of playing in which an original model of himself/herself is combined with another model in the augmented reality space.

The augmented reality display device according to the present disclosure may further include a model acquisition unit. The model acquisition unit analyzes an image including a real object and reads the model corresponding to tire real object from a storage unit or acquires the model corresponding to the real object from a server via a communication line, based on information obtained from the real object included in the image. Thus, feature information, such as the shape and the color, of the object and code information attached to the object are acquired from the real object included in the image, and a two-dimensional or three-dimensional existing model corresponding to the object is identified based on these pieces of information. Then, it is only necessary to read the existing model from the storage unit included in the augmented reality display device itself or download the existing model from the server via Internet and the like. Accordingly, the existing model can be utilized, thus allowing the virtual model corresponding to the real object to appear in the augmented reality space easily at a high speed.

In the augmented reality display device according to the present disclosure, the model control unit preferably automatically at least partially corrects at least one of a size, a shape, and a texture of both or one of the first model and the second model when the model control unit connects the joint of the first model and the joint of the second model. Thus, by automatically correcting the size and the like at the connection of the models, the connection between the models can be more naturally achieved.

The augmented reality display device according to the present disclosure may further include an interface and a candidate model sorting unit. The interface accepts a selection of the joint of the model by an input operation of the user. The candidate model sorting unit sorts out one or a plurality of candidates of another virtual model including a joint connectable to the joint selected by the interface, and displays information regarding the sorted-out virtual model in the display unit. Thus, the information of the model connectable to the selected joint is presented to the user, thereby allowing the user to easily find a desired model. For example, when the present disclosure is used for a service selling models as products, presenting the candidate models by the above-described operation can encourage the user to purchase the model.

A second aspect of the present disclosure relates to a computer program. The program according to the present disclosure causes a general-purpose portable information terminal to function as the augmented reality display device according to the first aspect described above. The exemplary portable information terminal is a smart phone, a tablet terminal, a laptop terminal, a head-mounted display, and a head-up display. The program according to the present disclosure may be preinstalled to a portable terminal device, may be downloadable via a communication line, such as Internet, or may be recorded in a computer readable medium, such as a compact disc read-only memory (CD-ROM).

According to the augmented reality technology of the present disclosure, images can be combined in a virtual space in real-time irrespective of whether a predetermined object of a real space is present or not.

BRIEF DESCRIPTION OF DRAWINGS

FIGS. 4A to 4C illustrate an exemplary data structure of a database that records various kinds of information regarding the models;

FIGS. 7A to 7C schematically illustrate a process to read a virtual model corresponding to an image of a real object from the image;

FIG. 12A to 12C schematically illustrate a variant pattern of the operation for connecting the models to each other.

DESCRIPTION OF EMBODIMENTS

The following describes embodiments of the present invention using the drawings. The present invention is not limited to the configurations described below, but includes those appropriately changed from the configurations below by a person skilled in the art within an obvious range.

Figure 1:
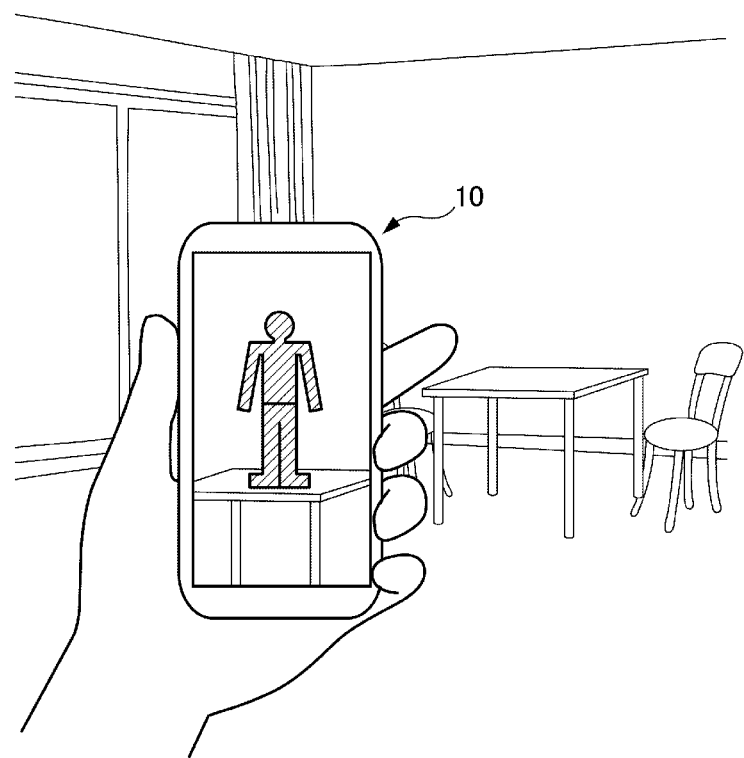
FIG. 1 illustrates one embodiment of an augmented reality display device according to the present disclosure, and schematically illustrates a state where a model is displayed in a display unit of the device.

FIG. 1 illustrates a first embodiment of an augmented reality display device 10 according to the present invention. In this embodiment, the augmented reality display device 10 is achieved by what is called a smart phone. As illustrated in FIG. 1, the augmented reality display device 10 uses a real space taken by an imaging unit (camera) as a background image and displays a video in which a two-dimensional or three-dimensional model is superimposed on the background image in a display unit (display). In respective drawings of this application, virtual models illustrated by a computer graphics technology are indicated with diagonal hatching.

Figure 2:
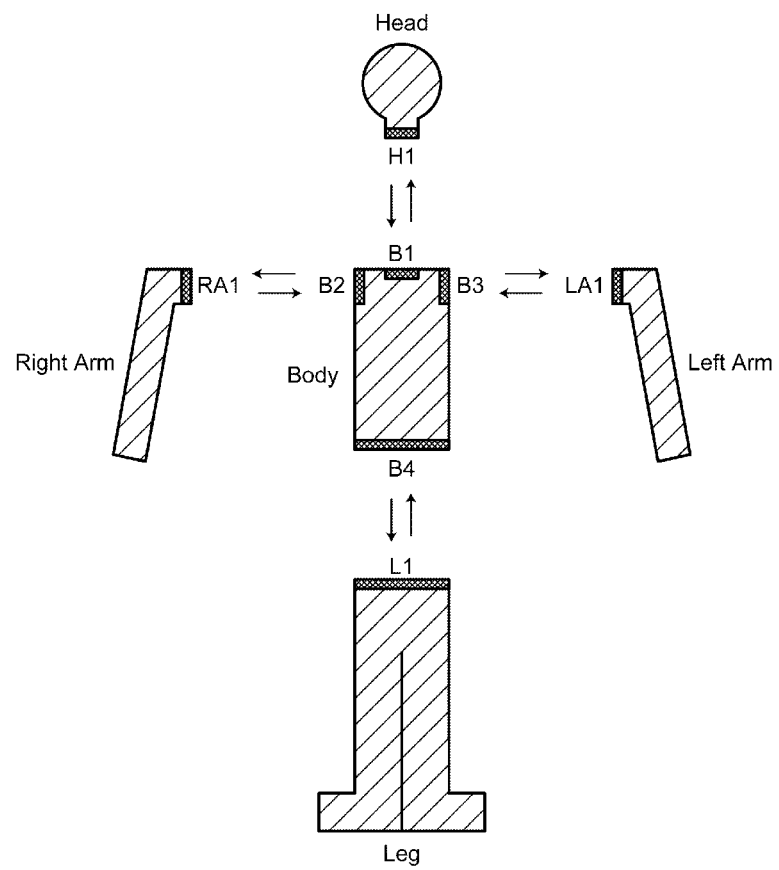
FIG. 2 schematically illustrates a relationship among a plurality of connectable models.

FIG. 2 illustrates a connecting structure of assembly type models as one characteristic of the present invention. As illustrated in FIG. 2, in the present invention, the models each include one or a plurality of joints. For example, in the example illustrated in FIG. 2, a model "Body" includes four joints of B1, B2, B3, and B4. A joint H1 of a model "Head" can be connected to the joint B1 of the model "Body." Similarly, as illustrated in FIG. 2, a joint RA1 of a model "Right Arm," a joint LA1 of a model "Left Arm," and a joint L1 of a model "Leg" are connectable to the joints B2, B3, and B4 of the model "Body," respectively. Thus, in this embodiment, a way of playing like an assembling model can be realized in an augmented reality space.

In the examples illustrated in FIG. 1 and FIG. 2, a three-dimensional human-shaped model like an action figure, a plamodel (registered trademark), or the like is illustrated as an exemplary assembly type model. This human-shaped model includes a body portion, a head portion, a right arm portion, a left arm portion, and a leg portion, which are each an individual model, and connecting all the models at the respective joints described above provides a completed model. Note that, in the present invention, the assembly type model is not necessarily the human-shaped model, but may be, for example, equipment and an accessory mounted to the human-shaped model, may be the one imitating another character, or may be a vehicle shape, such as an automobile, a train, an aircraft, and a ship. While details will be described later, the assembly type model can be a model of a diorama expressing a scenery, such as a rail of a train, a station building, a railroad crossing, a construction of a building and the like, a natural object, of a tree, a rock, a mountain, and the like. The assembly type model can include various kind of models in addition to those described above.

Figure 3:
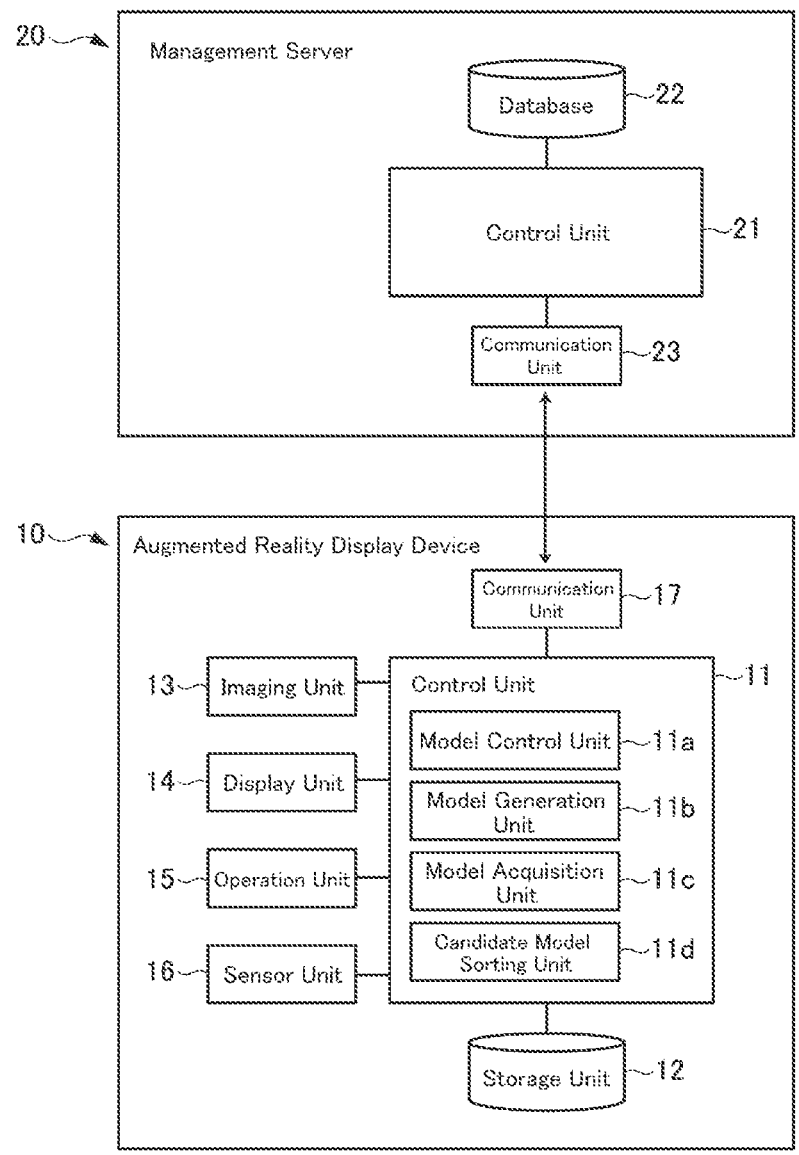
FIG. 3 is a block diagram illustrating an exemplary function composition of the augmented reality display device and a management server.

FIG. 3 is a block diagram illustrating a function composition of a server/client type system that includes the augmented reality display device 10 and a management server 20. The augmented reality display device 10 and the management server 20 are coupled via a communication line, such as Internet, and can mutually transmit and receive information. In this embodiment, the management server 20 stores information (modeling data and its metadata) regarding a plurality of models, and the augmented reality display device 10 downloads the information regarding the models from the management server 20 and causes the display unit 14 to display the information, as necessary. While the illustration is omitted, in another embodiment, the information regarding the plurality of models can be stored in the augmented reality display device 10 itself. In this case, the management server 20 is not necessary.

The augmented reality display device 10 is a device that has at least a function of taking an image of a real space and displaying the captured image and a virtual model in a superposed manner. The augmented reality display device 10 is achieved by known smart phone and head-mounted display and the like. Specifically, an application program for executing processing specific to the augmented reality display device 10 according to the present invention is stored in a general-purpose portable information terminal, such as a smart phone. This terminal functions as the augmented reality display device 10 according to the present invention by executing this program. As illustrated in FIG. 3, the augmented reality display device 10 basically includes a control unit 11, a storage unit 12, an imaging unit 13, a display unit 14, an interface 15, a sensor unit 16, and a communication unit 17.

The control unit 11 of the augmented reality display device 10 entirely controls the other components 12 to 17 included in the augmented reality display device 10. As the control unit 11, a known processor, such as a central processor unit (CPU) and/or a graphical processor unit (GPU), can be used. The control unit 11 reads an application stored in the storage unit 12, and controls the other components in accordance with the application program. Specifically, the control unit 11 causes the display unit 14 to display a background image of a real space taken by the imaging unit 13. The control unit 11 causes the display unit 14 to display a model received from the management server 20 via the communication unit 17 together with the background image, and controls a behavior and the like of this model based on input information from the interface 15 and the sensor unit 16. The control unit 11 includes a model control unit 11a, a model generation unit 11b, a model acquisition unit 11c, and a candidate model sorting unit 11d as main function blocks. Details of these function blocks 11a to 11d will be described later with reference to FIG. 4A to FIG. 8.

The storage unit 12 is a component to store information used for controlling the display of the augmented reality. Specifically, the storage unit 12 stores an application program that causes a general portable information terminal, such as a smart phone, to function as the augmented reality display device 10. The application program stored in the storage unit 12 is read by the control unit 11 when displaying the augmented reality, and processing is executed in accordance with the program. A plurality of other application programs may be stored in the storage unit 12. The storage function of the storage unit 12 can be achieved by a non-volatile memory, such as a hard disk drive (HDD) and/or a solid-state drive (SDD). The storage unit 12 may have a function as a memory to write or read a progress and the like of arithmetic processing by the control unit 11. The memory function of the storage unit 12 can be achieved by a volatile memory, such as a random access memory (RAM), for example, a random access memory (DRAM).

The imaging unit 13 is a camera to acquire image data of a still image or a moving image. For the camera constituting the imaging unit 13, a camera included in the augmented reality display device 10 is used. The image data acquired by the imaging unit 13 is transmitted to the control unit 11, and displayed by the display unit 14 after predetermined arithmetic processing is performed. This image data may be saved in the storage unit 12. The camera includes, for example, a lens, a mechanical shutter, a shutter driver, a photoelectric conversion element, such as a charge-coupled device (CCD) image sensor unit and a complementary metal-oxide-semiconductor (CMOS) image sensor unit, a digital signal processor (DSP) that reads an electric charge amount from the photoelectric conversion element to generate image data, and an integrated circuit (IC) memory.

The display unit 14 is a component that displays a predetermined image. The display unit 14 includes a known display device, such as a liquid crystal display and an organic electroluminescent (EL) display. In the present invention, the display unit 14 displays mainly a two-dimensional or three-dimensional model together with the background image of the real space.

The interface 15 is a component to input operation information to the augmented reality display device 10 by a user. A known input device, such as a touch panel, a computer mouse, a keyboard, and a stylus pen, can be used as the interface 15. A touch panel display may be configured by disposing the touch panel (interface 15) in a front surface of the display (display unit 14). The interface 15 may be physically separable from the augmented reality display device 10. In this case, the interface 15 is connected to the augmented reality display device 10 via a short-range wireless communication standard, such as Bluetooth (registered trademark).

The sensor unit 16 is a component to input sensing information to the augmented reality display device 10. The example of the sensor unit 16 includes an acceleration sensor, a gyro sensor, a microphone, a global positioning system (GPS) sensor, a proximity sensor, a luminance sensor, and the like, and the augmented reality display device 10 includes one or a plurality of kinds of sensors. In the present invention, the sensor unit 16 is used for a posture detection of the augmented reality display device 10. That is, the sensor unit 16 that includes the acceleration sensor and the gyro sensor detects amounts of change in a photographing direction and a photographing range of the imaging unit 13 of the augmented reality display device 10 as the sensing information. Then, the control unit 11 (mainly, model control unit 11a) uses the sensing information to control a display position and a display direction of the model. For example, the control unit 11 only needs to perform a control such that a model is appeared at a specific position in a real space, and the model is displayed in the display unit 14 when the model present at the specific position enters in the photographing range of the imaging unit 13.

The communication unit 17 of the augmented reality display device 10 is a component to communicate with mainly the management server 20 via a communication line, such as Internet. Specifically, when a download request of a predetermined model is generated by the control unit 11, the communication unit 17 transmits it to the management server 20. The communication unit 17 receives information regarding the various models stored in a database 22 of the management server 20, and transmits it to the control unit 11.

The management server 20 is a web server that has a function to mainly control the models provided to the augmented reality display device 10. The models and the information regarding them stored in the management server 20 can be updated (added, changed, deleted) as needed. The management server 20 may include one web server, or may include a plurality of web servers to which the function of the management server 20 is assigned. The management server 20 is basically managed by an operator that provides the user with a service relating to the augmented reality. As illustrated in FIG. 3, the management server 20 basically includes a control unit 21, the database 22, and a communication unit 23.

The control unit 21 of the management server 20 entirely controls the other components 22, 23 included in the management server 20. As the control unit 21, a known processor, such as a CPU and/or a GPU, can be used. Mainly, when receiving the download request from the augmented reality display device 10, the control unit 21 reads the model corresponding to the download request and the information regarding it from the database 22, and transmits these pieces of the information to the augmented reality display device 10 via the communication unit 23.

The database 22 stores the information regarding the various models provided to the augmented reality display device 10. FIGS. 4A to 4C illustrate data structures of a relational database as an example of the data included in the database 22. For example, the database 22 includes a model table of FIG. 4A, a connection condition table of FIG. 4B, and an owned model table of FIG. 4C.

The model table records the information regarding the various kinds of models displayed by the augmented reality display device 10. Especially, the model table records information of the joint included in the model for each model. Specifically, the model table includes a model identification information (ID) field (column), a series field, a part field, a model name field, and a joint field.

The model ID field records identification information (ID) unique to the models. The series field records series names to which the respective models belong. For example, in the illustrated example, the model IDs 0001 to 0005 belong to Series A, and the model IDs 0006 to 0010 belong to Series B. For example, the models belonging to the same series have a common feature, for example, the same design applied thereto, a sense of unity caused by production under the same design concept, or the like. The part field records the parts of the models. For example, in the example illustrated in FIGS. 4A to 4C, since the assembly type human-shaped model illustrated in FIG. 2 is assumed, the model is divided into the respective part models of a head portion (Head), a body portion (Body), a left arm portion (Left Arm), a right arm portion (Right Arm), and a leg portion (Leg), for example. The model name field records the names unique to the models. The joint field records identification information of one or a plurality of joints included in each model.

Like the example illustrated in FIGS. 4A to 4C, in the present invention, it is preferable that the joints are normalized such that a plurality of models include common joints, not that the models each include unique joints. That is, while the model ID 0002 and the model ID 0007 are mutually different models, for example, they include the common joints B1, B2, B3, and B4. For example, the joint RA1 is connectable to the joint B2. Since the joints are normalized, another model including the joint RA1 is also connectable to the joint B2 of the model ID 0002 and the joint B2 of the model ID 0007. Thus, normalizing the joints allows replacement of the model.

The connection condition table records the connectable conditions of the joints. For example, the joint H1 is set to be connectable to the joint B1. The joint B1 is set to be connectable to the joint H*. Here, "*" means that the connectable condition only needs to be a partial match, and means that, for example, a prefix "H" of the identification information of the joint satisfies the connectable condition irrespective of the value following "H," such as "H1" and "H2." Therefore, the joint B1 is connectable to both of the joints H1 and H2. Then, like the relationship between the joint H1 and the joint B1, the joints mutually satisfying the connectable condition are determined to be connectable, for example, the joint H1 is connectable to only the joint B1. The joint B1 is connectable to the joints H1 and H2, and in addition, connectable to other joints (for example, H3 and H4 (not illustrated)) having the prefix H.

The connectable condition may include an additional condition as a condition other than the condition indicating the connectable joint. In the example illustrated in FIGS. 4A to 4C, information of the series field recorded in the model table is set as the additional condition. For example, the joint H2 is set to be connectable to the joint that is the joint B1 and included in the model belonging to Series B. That is, the joint H2 is not connectable to the joint B1 of the model belonging to Series A, but connectable to only the joint B1 of the model belonging to Series B. Thus, the additional condition may be set to restrict, the connectable joint.

In addition to the connectable conditions, the connection condition table may also record the difficulty level of connecting the joints. In the example shown in FIG. 4B, the difficulty level is set from A to D for each combination of joints that can be connected. Difficulty level A is the most difficult and difficulty level D is the easiest. The parameters related to the connection between the joints change according to this difficulty level. For example, the higher the difficulty level, the shorter a prescribed distance (distance r2 explained below) at which the joints are automatically connected, or the longer the time to keep the joints at prescribed distance in order to connect them. Alternatively, the higher the difficulty level, the smaller the size of the joints may be set. By setting the difficulty level for connecting the joints in this way, the user can feel a sense of accomplishment when the model is completed. The parameters related to the connection of joints that vary with the difficulty level are not limited to the distance, the time, and the size explained here. The difficulty level can be lowered or raised by obtaining items to change the difficulty level, for example.

The owned model table is a table that, records information regarding the owned model for each user. For example, the user can freely cause the model owned by himself/herself to appear in the augmented reality space and use it. Meanwhile, the user cannot use the model not owned by himself/herself, and for using it, it is necessary to additionally obtain it (for example, purchase, generate, exchange with another user, and given from another user). The owned model table includes a user ID field to record ID unique to the user, an owned model ID field to record ID of the model owned by the user, and an acquisition source field to record an acquisition source of each model. For the acquisition source of the model, for example, "Generate" means a model generated by the user himself/herself (for example, see FIGS. 6A to 6C). "Capture" means a model downloaded from a server triggered by photographing of a predetermined real object by the user (for example, see FIGS. 7A to 7C). "Download" means a model downloaded from a server by the user (for example, see FIG. 8). In addition, as the acquisition source of the model, it is considered, for example, to exchange the model with another user and to be given from another user.

The communication unit 23 of the management server 20 is a component that communicates with mainly the augmented reality display device 10 via a communication line such as Internet. The communication unit 23 mainly transmits the information regarding the various models stored in the database 22 to the augmented reality display device 10.

Figure 5A:
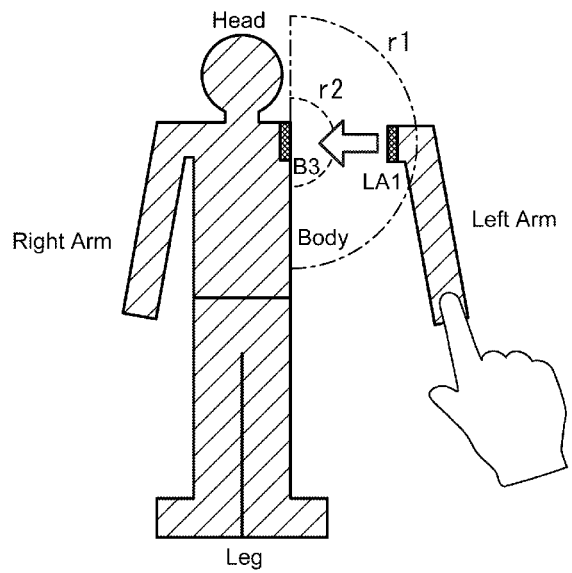
FIGS. 5A and 5B schematically illustrate an operation of connecting the models.

Subsequently, an exemplary method for connecting the models will be described with reference to FIGS. 5A and 5B. FIG. 5A exemplarily illustrates a state where the left arm portion model (Left Arm) is connected to the body portion model (Body). As illustrated in FIG. 5A, the display unit 14 displays a model in which the head portion model (Mead), the right arm portion model (Right Arm), and the leg portion model (Leg) are connected to the body portion in an augmented reality space (space in which a real space and a virtual space are combined and a virtual model is superimposed on a real background image). In this augmented reality space, the left arm portion model is displayed in a state of being separated from the other models.

Figure 5B:
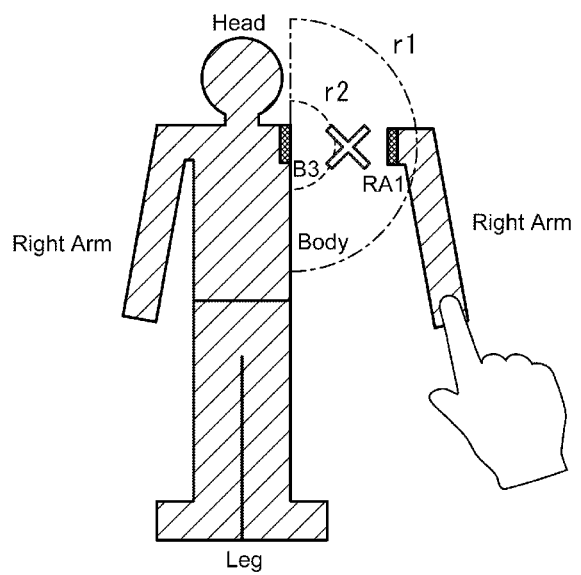

In the example illustrated in FIGS. 5A and 5B, the display unit 14 and the interface 15 constitute the touch panel display, and the user can freely operate each model by touching. The model control unit 11a included in the control unit 11 controls these models present in the augmented reality space (specifically, virtual space). For example, by sliding a finger to up and down and right and left in a state of touching the model with the one finger, the model can be moved. By sliding two fingers to up and down and right and left in a state of touching the model with the two fingers, the direction of the model can be changed. By increasing a distance between the two fingers (pinch out) and decreasing the distance between the two fingers (pinch in) in a state of touching the model with the two fingers, the size of the model can be changed. In addition, the model control unit 11a can control the move and the change of the mode) in the virtual space corresponding to the various operations by the user, for example, an operation of touching the model twice with one finger, and an operation of touching three times.

In the example illustrated in FIG. 5A, the user performs an operation of bringing the joint LA1 of the left arm portion model closer to the joint B3 of the body portion model. In this example, a range apart from the joint B3 of the body portion model by a distance r1 is indicated by a one dot chain line, and a range apart from the joint B3 of the body portion model by a distance r2 is indicated by a dotted line (note that distance r2<distance r1). In this case, when the joint LA1 of the left arm portion approaches the joint B3 of the body portion, the joint LA1 enters the range of the distance r1 at first. Then, when the joint LA1 enters the range of the distance r1, the model control unit 11a determines whether the joint LA1 and the joint B3 mutually satisfy the connectable condition or not. For example, as illustrated in FIGS. 4A to 4C, since the connectable condition is recorded in the connection condition table, the model control unit 11a only needs to refer to this table. Then, the joint LA1 and the joint B3 are determined to be connectable, the model control unit 11a performs a guide display indicating that the joints LA1 and B3 are connectable. In FIG. 5A, an "arrow" is displayed as an example of the guide display. That is, to indicate that the joint LA1 of the left arm portion and the joint B3 of the body portion are connectable, the "arrow" indicates a direction of the presence of the joint B3 of the body portion viewed from the left arm portion in the current moving operation. Thus, the user can easily understand that both models are connected by tracing the "arrow" to bring the left arm portion closer to the body portion.

Next, when the joint LA1 of the left arm portion further approaches the joint B3 of the body portion and enters the range of the distance r2, the model control unit 11a automatically connects the joint LA1 to the joint B3. This facilitates the connecting operation of the models for the user. By performing the connecting process corresponding to the distance of the joint, a plurality of the models can be connected without depending on the shape and the like of the model, thus allowing reduction in a load of the processing on the computer. Further, the model control unit 11a may automatically correct one or two or more of the size, the shape, and the texture of the entire or a part of each model when connecting the models of the left arm portion and the body portion. For example, when the model sizes (reduced scales) do not match between the left arm portion and the body portion at the connection, the model control unit 11a makes the sizes of both models match and connects both models together. The model control unit 11a may change the model shape of both or one of the left arm portion and the body portion such that the state after connecting both models look more natural. Furthermore, when there is a difference in texture (color, appearance, and the like) between the models of the left arm portion and the body portion at the connection, the model control unit 11a may make the textures of both models match and connect both models.

Meanwhile, in the example illustrated in FIG. 5B, the user performs an operation of bringing the joint RA1 of the right arm portion model closer to the joint B3 of the body portion model. Here, the joint RA1 of the right arm portion cannot be connected to the joint B3 of the body portion. In this case, when the joint RA1 of the right arm portion approaches the joint B3 of the body portion and enters the range of the distance r1, the model control unit 11a performs a guide display indicating that the joints RA1 and B3 are not connectable. For example, as illustrated in FIG. 5B, it is only necessary to display "x" between the joint RA1 of the right arm portion and the joint B3 of the body portion, thereby indicating that the models are mutually not connectable.

While FIGS. 5A and 5B illustrate the processing to connect the models, separating each model from the already connected model is also obviously allowed. In this case, when an operation opposite to the above-described operation for connecting the models is performed, the model control unit 11a only needs to perform a control to separate each model. Thus, the models can be freely connected and separated via the joints.

Figure 6A:
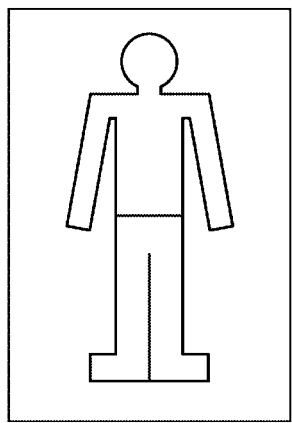
FIGS. 6A to 6C schematically illustrate a process to generate a virtual model from an image of a real object.
Figure 6B:
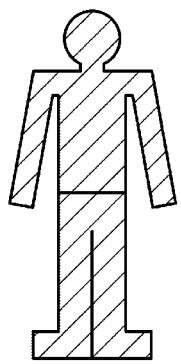
Figure 6C:
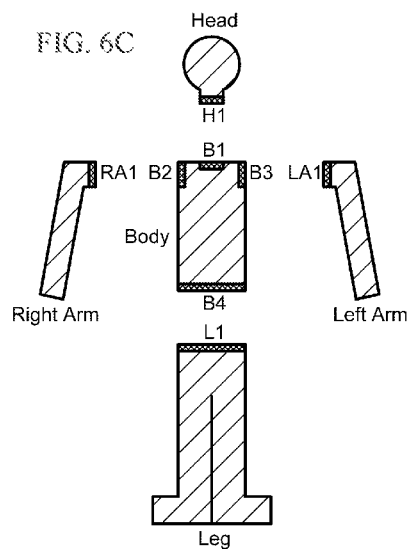

Subsequently, an exemplary method for acquiring the model by the user with reference to FIG. 6A to FIG. 8. FIGS. 6A to 6C illustrate a method for generating a two-dimensional or three-dimensional virtual model from a real object included in a captured image. FIG. 6A illustrates a captured image including a real object, such as an action figure and an assembling model made of plastic. The real object is not limited to the action figure or the assembling model, but may be, for example, a rail of a train, a station building, a railroad crossing, a construction of a building and the like, a natural object of a tree, a rock, a mountain, and the like. The augmented reality display device 10 acquires the captured image that includes such a real object. The captured image may be an image taken by the imaging unit 13, or may be an image downloaded via Internet and the like. While FIG. 6A illustrates the captured image of the object in front view, only the captured image of the object in front view is sufficient when the two-dimensional model is generated. Meanwhile, when the three-dimensional model is generated, it is preferable to acquire a plurality of images of the same object taken from different angles. That is, it is preferable to acquire the captured images of the object taken from multiple angles, such as a back side, a left side, a right side, a plane, a bottom, and further, perspective views in addition to the front view of the object illustrated in FIG. 6A.

Next, as illustrated in FIG. 6B, the model generation unit 11b analyzes one or a plurality of the captured images and generates a two-dimensional or three-dimensional model from the real object included in the images. For example, when the two-dimensional model is generated, the model generation unit 11b only needs to identify a contour of the real object included in one captured image to form a planar outer edge of the model along the contour, and set a coloring and a design of the model so as to correspond to a coloring and a design of the real object. When the three-dimensional model is generated, the model generation unit 11b only needs to form a three-dimensional outer edge of the model based on a plurality of the captured images of the same object taken from the different angles and set a coloring and a design of the model so as to correspond to colorings and designs of the respective images. The process to generate the two-dimensional or three-dimensional model from the captured image is not limited to the one described above, but a known process can be employed, as necessary.

Next, as illustrated in FIG. 6C, the model generation unit 11b sets the joints to the model generated as described above. Specifically, at first, the model generation unit 11b extracts points (hereinafter referred to as "separation points") for separating the part models from a completed model in accordance with a predetermined rule. As the predetermined rule, for example, in the completed model, a part decreased in thickness or width compared with other parts, such as a base of the arm, the neck, and a narrowed portion of the body, may be employed as the separation point. In the completed model, a part in which the coloring or the design is significantly changed compared with the other parts may be employed as the separation point. The separation point of one model can be automatically formed by performing a machine learning using a preliminarily generated data set of a plurality of models and their separation points as teacher data and referring to a learned model obtained by the machine learning.

Next, the model generation unit 11b sets the joint to the separation point formed as described above. This allows the models of the respective parts to be freely removed from or attached to the completed model. For example, when the joints are normalized as illustrated in FIG. 4B, the model generation unit 11b only needs to select the appropriate joint from the normalized joints and set it to the separation point of the model. This allows not only the connection/separation of the part models separated from the same model, but also the replacement with the part model separated from the other model. For example, assume a case where a completed model A is separated into part models A1 and A2, and a completed model B is separated into part models B1 and B2. In this case, using the normalized joints allows not only a reconnection of A1 and A2 and a reconnection of B1 and B2, but also a connection of A1 and B2 and a connection of B1 and A2.

The model generation unit 11b registers the information regarding the models generated as described above to the database 22 of the management server 20. Specifically, for the newly generated model, it is only necessary to set information corresponding to the respective fields (rows) of the model table illustrated in FIG. 4A and record the information for each part model. The model ID, the part, the model name, and the joint can be automatically assigned. The models of the parts separated from one completed model only need to be registered as the same series. By collectively managing the models generated by the respective users by the management server 20, for example, the model generated by one user can be downloaded and used by another user. In this case, the models may be exchanged, bought, and sold between the users.

FIGS. 7A to 7C illustrate a method for reading an existing model preliminarily stored in the storage unit 12 and the database 22 based on the real object, included in the captured image. That is, in the example illustrated in FIGS. 7A(a) to 7C(c), the two-dimensional or three-dimensional model is not newly generated, but the real object included in the captured image triggers the existing model corresponding thereto to be read from the database 22 and the like. Specifically, the model acquisition unit 11c of the control unit 11 analyzes the captured image illustrated in FIG. 7(a), and extracts a feature point of the real object included in the image. The feature point includes the contour, the coloring, the design, and the like of the object. When a code, such as a two-dimensional code (barcode) and a three-dimensional code (QR code (registered trademark)), is attached to the real object, the model acquisition unit 11c may extract the code as the feature point from the captured image and acquire information embedded in the code. In this case, it is only necessary to embed the ID information of the model corresponding to the real object in the code.

Next, as illustrated in FIG. 7B, the model acquisition unit 11c reads the model corresponding to the feature point and the code (ID information) extracted from the captured image from the storage unit 12 of the augmented reality display device 10 or the database 22 of the management server 20 based on the feature point and the code (ID information) extracted from the captured image. As illustrated in FIG. 7C, the joints are already set to the model stored in the storage unit 12 and the database 22. This embodiment allows a service deployment in which, for example, the user purchases an action figure or an assembling model of an actual object and subsequently photographs it by a smart phone (augmented reality display device 10), thereby allowing downloading the two-dimensional or three-dimensional model corresponding to the action figure or the like from the management server 20. Since the models can be freely assembled or replaced with the other model in the augmented reality space, the present invention can expand the way of playing of the actually purchased action figure and the like.

Figure 8:
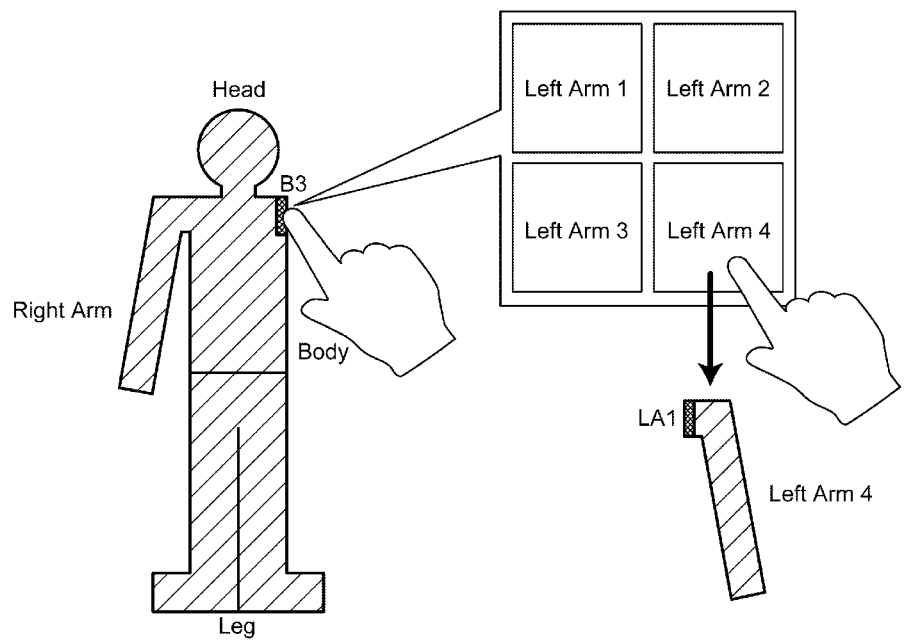
FIG. 8 schematically illustrates a process to display model candidates connectable to one joint.

FIG. 8 illustrates a method for specifying a joint of a model to acquire the other model connectable to the specified joint. For example, as illustrated in FIG. 8, when the user specifies a joint of one model by operating the touch panel display or the like, the candidate model sorting unit 11d of the control unit 11 sorts out candidates of the model that includes the joint connectable to the joint specified by the user from the multiple models stored in the database 22 of the management server 20 (or the storage unit 12 of the augmented reality display device 10). The candidate model sorting unit 11d displays the model candidates sorted out here in the display unit 14. For example, in the example illustrated in FIG. 8, the joint B3 of the body portion model (Body) is specified by the user. The joint LA1 of the left arm portion model (Left Arm) is connectable to the joint B3 of the body portion. Therefore, the candidate model sorting unit 11d sorts out a plurality of left arm portion models (Left Arms 1 to 4) including the joints LA1 as candidates, and displays the candidates in the display unit 14.

Next, the user selects any model from the plurality of models displayed as the candidates. Then, the model selected by the user is read from the database 22 of the management server 20 (or the storage unit 12 of the augmented reality display device 10) and appears in the augmented reality space. The model thus appeared in the augmented reality space can be connected to the other model by the procedure similar to that illustrated in FIG. 5A. Thus, the user can specify the joint, thereby easily searching and acquiring the other model connectable thereto.

Figure 9A:
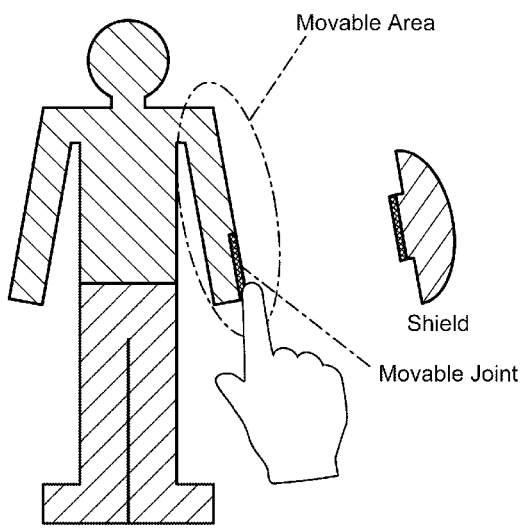
FIGS. 9A and 9B schematically illustrate an operation of connecting the models comprising a movable joint.
Figure 9B:
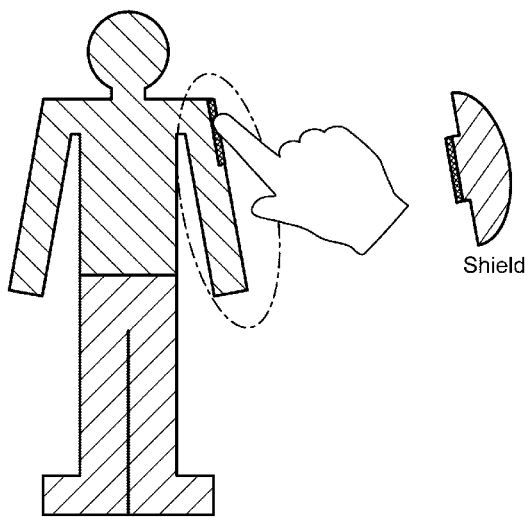

FIGS. 9A and 9B show a movable joint as an application example of the joint. The position of the movable joint can be freely changed by the user within a predetermined movable area set in the model. For example, in the example shown in FIG. 9A, the movable joint is set near the wrist of the left arm model, and then the user can move the position of the movable joint to near the shoulder of the same left arm model, as shown in FIG. 9B. A shield model (Shield) can be connected to the movable joint of the left arm model. In the example shown in FIGS. 9A and 9B, the movable area of the movable joint spans the entire model, but it is also possible to limit the movable area to only a part of the model. By making the position of the joint variable in this way, the user can freely adjust the connection position of other models. This allows the shape of the model to be customized according to the users preference.

Figure 10A:
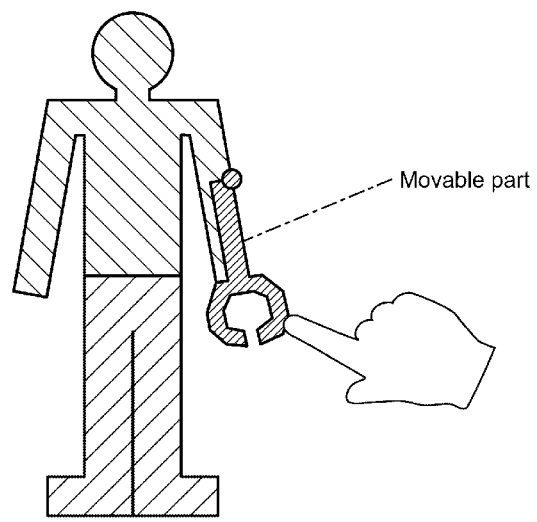
FIGS. 10A and 10B schematically illustrate an operation of connecting the models comprising a hidden joint.
Figure 10B:
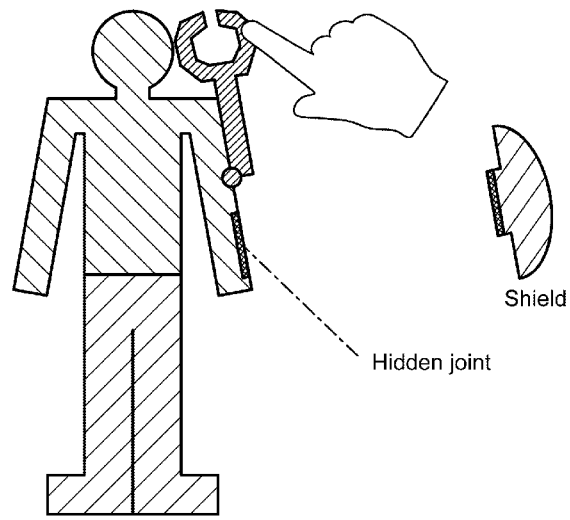

FIGS. 10A and 10B show a hidden joint as another application example of the joint. The hidden joint appears in position where it can be connected to other models by deforming all or part of the model to which it is attached. For example, in the example shown in FIG. 10A, the left arm model has a movable part, and the hidden joint does not appear on the surface of that left arm model. On the other hand, as shown in FIG. 10B, by moving the movable part, the hidden joint appears on the surface of the model of the left arm part. This means that the hidden joint is hidden by the movable part of the left arm. And then, the shield model (Shield) can be connected to the hidden joint of this left arm model. In this way, in the first state before the model is deformed, the hidden joint does not appear on the surface of that model, but in the second state after the model is deformed, the hidden joint appears on the surface of that model, allowing other models to be connected. This allows users to enjoy deforming the model and searching for the hidden joint in the model.

Figure 11:
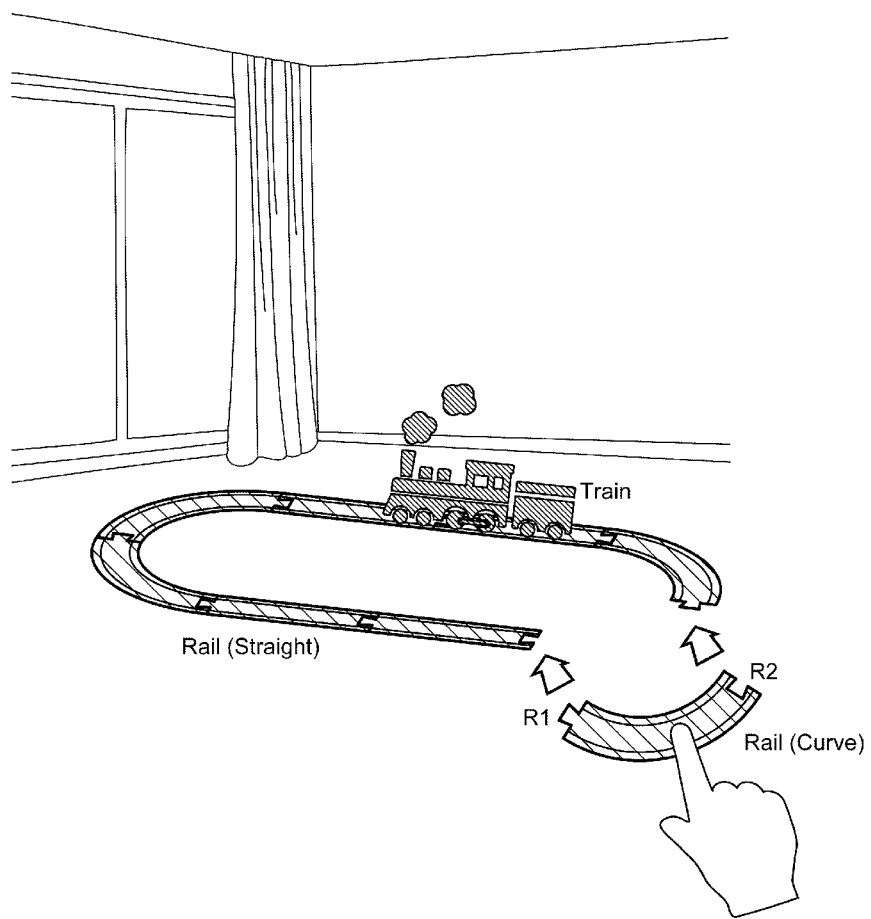
FIG. 11 illustrates another embodiment of the augmented reality display device according to the present disclosure, and schematically illustrates a state where models of a diorama are displayed in a display unit of the device.

FIG. 11 illustrates a second embodiment of the augmented reality display device 10 according to the present invention. In this embodiment, the augmented reality display device 10 is achieved by what is called a head-mounted display (not illustrated). The augmented reality display device 10 according to the second embodiment has a function composition basically similar to that (see FIG. 3) in the above-described first embodiment. However, the second embodiment is different from the first embodiment assuming the human-shaped model in that the model appeared in the augmented reality space is what is called a diorama.

As illustrated in FIG. 11, in this embodiment, a plurality of rail models (Rail) is displayed in an augmented reality space, and these rails can be connected at joints R1, R2. That is, the rails each include the protruding joint R1 at one end and the depressed joint R2 at the other end, and the joint R1 and the joint R2 are connectable. For the rails, for example, as illustrated in FIG. 11, a straight rail (Straight), a curved rail (Curve), or a rail of another shape is prepared. Accordingly, it is allowed to lay the rails in a free shape or freely extend the rails by sequentially interconnecting the joint R1 of one rail model to the joint R2 of another rail model in the augmented reality space.

In the example illustrated in FIG. 11, a train model (Train) running on the rail models is prepared. The train model may be generated from a captured image of a real train following the procedure illustrated in FIG. 6A and FIG. 6B, or may be read from the storage unit 12 or the database 22 based on the captured image of the real train following the procedure illustrated in FIG. 7A and FIG. 7B. The train model may be acquired by reading an existing model from the storage unit 12 or the database 22. The train model is programmed to run on the rail models in the augmented reality space. Therefore, the user can run his/her favorite train model on the rail models generated by himself/herself. While the illustration is omitted, the model that can be appeared in the augmented reality space is not limited to the rail or the train, but a model of a diorama expressing a scenery, such as a station building, a railroad crossing, a construction of a building and the like, a natural object of a tree, a rock, a mountain, and the like may be prepared, as necessary.

FIG. 12A to 12C show a variant of the model connecting operation. As shown in FIG. 12A, the user touches a joint of the first model and then drags his finger to specify the shape, length, or direction in which he wants another second model to be connected to the joint of the first model. Then, the second model is automatically connected to the joint of the first model according to the specified command by the user. In the example shown in FIG. 12B, a model that conforms to the shape specified by the user is automatically selected as the second model from the database 22 of the management server 20 for example, and the second model appears in the augmented reality space at this time and is automatically connected to the first model. On the other hand, in another example shown in FIG. 12C, a model closest to the shape specified by the user is automatically selected as the second model from among the models that have already appeared in the augmented reality space, and the second model is automatically connected to the first model. In this way, the computer may assist in the operation of connecting the models together. With such a user interface, users can more easily and quickly complete the models they want. When the virtual space side of the digital twin is traced by the user with a finger or hand, etc., the model may appear on the virtual space side.

In addition, in the present invention, the structure of the joints of each model may be made to correspond to real world objects and physical laws, although detailed illustrations are omitted. For example, the physical connection structure of the real world, in which the joints of two models are fitted, inserted, or caught by each other's shape, can be applied to the joints of each model in the augmented reality space. In this way, the assembly of models can be made more realistic. The automatic connection operation between models described above and the manual connection operation between models according to the physical laws described here may be selected by the user as desired. If the assembly operation of the models corresponds to the physical laws of the real world, the user can learn about mechanical structures and gain new insights while assembling the models in the augmented reality space, which is useful from the perspective of intellectual education.

While the term of augmented reality (AR: Augmented Reality) is used in the present invention, the present invention may be categorized in the technology of a virtual reality (VR: Virtual Reality), a mixed reality (MR: Mixed Reality), or an XR that is a general term of them depending on the embodiments.

In this application, the embodiments of the present invention have been described above by referring to the drawings to express the contents of the present invention. However, the present invention is not limited to the embodiments described above, but includes changed configurations and improved configurations obvious to those skilled in the art based on the matters described in this application.

The invention claimed is:

1. An augmented reality display device comprising:
   a camera configured to acquire a background image of a real world;
   a processor configured to control a two-dimensional or three-dimensional model in a virtual space; and
   a display configured to display the model together with the background image,
   wherein the model includes one or more joints configured to connect to another model, and
   wherein the processor is configured to control each model to connect a joint of a first model and a joint of a second model in the virtual space.

2. The augmented reality display device according to claim 1, wherein
   the processor is configured to control each model to connect the first model and the second model at the joints of the first and second models when the joint of the first model and the joint of the second model are within a predetermined range in the virtual space.

3. The augmented reality display device according to claim 1, wherein
   the processor is configured to assign metadata to each joint of the one or more joints, the metadata identifying a connectable model or joint is assigned to each joint, and
   wherein the processor is configured to analyze the metadata of the joints of the first and second models within the predetermined range in the virtual space, and further configured to connect the first model and the second model at the joints of the first and second models when the processor determines that the joints of the first and second models are mutually connectable.

4. The augmented reality display device according to claim 1, wherein the processor is further configured to analyze an image including a real object and generates a two-dimensional or three-dimensional model from the real object included in the image,
   wherein the one or more joints are the one or more first joints, and
   wherein the processor is configured to set one or more second joints to the generated model, and the second one or more joints are configured to connect to another model.

5. The augmented reality display device according to claim 1, wherein the processor is configured to analyze an image including a real object and further configured to either read the model corresponding to the real object from memory or acquire the model corresponding to the real object from a server via a communication line, based on information obtained from the real object included in the image.

6. The augmented reality display device according to claim 1, wherein
   the processor is further configured to automatically, at least partially, correct at least one of a size, a shape, or a texture of at least one of the first model or the second model when the processor connects the joint of the first model and the joint of the second model.

7. The augmented reality display device according to claim 1, further comprising:
   an interface configured to accept a selection of the joint of the model,
   wherein the processor is further configured to select one or more candidates of another model including a joint configured to connect to the joint selected by the interface, and further configured to display information regarding the one or more candidates of the other model in the display.

8. A non-transitory recording medium storing a program configured to cause a portable information terminal to function as the augmented reality display device according to claim 1.

* * * * *